US008166759B2

(12) United States Patent
Yaguchi et al.

(10) Patent No.: US 8,166,759 B2

(45) Date of Patent: May 1, 2012

(54) EXHAUST HEAT RECOVERY APPARATUS

(75) Inventors: Hiroshi Yaguchi, Susono (JP); Daisaku Sawada, Gotenba (JP); Shinichi Mitani, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 280 days.

(21) Appl. No.: 12/162,874

(22) PCT Filed: Feb. 1, 2007

(86) PCT No.: PCT/IB2007/000236

§ 371 (c)(1), (2), (4) Date: Jul. 31, 2008

(87) PCT Pub. No.: WO2007/088463

PCT Pub. Date: Aug. 9, 2007

(65) Prior Publication Data

US 2009/0013686 A1 Jan. 15, 2009

(30) Foreign Application Priority Data

Feb. 2, 2006 (JP) ................................ 2006-025881

(51) Int. Cl.
*F01K 23/10* (2006.01)
*F02G 3/00* (2006.01)

(52) U.S. Cl. .............................. 60/618; 60/616; 60/620

(58) Field of Classification Search ............ 60/516–526, 60/614–624, 712; 123/52.4, 52.6, 53.2, 53.5
See application file for complete search history.

(56) References Cited

U.S. PATENT DOCUMENTS 3,180,078 A * 4/1965 Liston ............................ 60/280
4,086,771 A * 5/1978 Barrett ............................ 60/616
4,121,423 A * 10/1978 Querry et al. .................. 60/616
4,235,077 A * 11/1980 Bryant ............................ 60/618
4,300,353 A * 11/1981 Ridgway ......................... 60/618
4,599,863 A * 7/1986 Marttila .......................... 60/616
4,754,606 A * 7/1988 Nam .............................. 60/616
4,894,995 A 1/1990 LaSota
4,901,531 A * 2/1990 Kubo et al. ..................... 60/618
6,508,223 B2 * 1/2003 Laimbock et al. ......... 123/195 P (Continued)

FOREIGN PATENT DOCUMENTS

DE 24 50 033 4/1976

(Continued)

OTHER PUBLICATIONS

Japanese Office Action dated Dec. 24, 2008.

*Primary Examiner* — Thomas Denion
*Assistant Examiner* — Christopher Jetton
(74) *Attorney, Agent, or Firm* — Finnegan, Henderson, Farabow, Garrett & Dunner, LLP

(57) ABSTRACT

An exhaust heat recovery apparatus includes a reciprocating internal combustion engine in which a piston reciprocates in a cylinder to generate motive power; and a Stirling engine that recovers the thermal energy of the exhaust gas discharged from the internal combustion engine and converts the thermal energy into kinetic energy. The Stirling engine is united with the internal combustion engine. A heater that the Stirling engine includes is disposed in an exhaust manifold of the internal combustion engine. With this configuration, it is possible to restrict reduction in the power output from the exhaust heat recovery means.

33 Claims, 9 Drawing Sheets

23 23e 28 10 105 A A Ex 20B 22 21 24 26 20C 27 29 Ex 20 114B 114A 100C Ze Zc_e 25 110 Zc_s Zs 100 11 W

U.S. PATENT DOCUMENTS

2004/0060292 A1* 4/2004 Minemi et al. .................. 60/616
2005/0050909 A1* 3/2005 Nagatani et al. ............ 62/323.1

FOREIGN PATENT DOCUMENTS

DE 90 13 565.2 11/1990
DE 197 01 160 A1 7/1997
JP 57-26241 2/1982
JP 5-231144 9/1993
JP 2002-266701 9/2002
JP 2005-113810 4/2005
JP 2005-337178 12/2005
JP 2006-188957 7/2006

* cited by examiner

EXHAUST HEAT RECOVERY APPARATUS

CROSS-REFERENCE TO RELATED APPLICATIONS

This application is a national phase application of International Application No. PCT/IB2007/000236, filed Feb. 1, 2007, and claims the priority of Japanese Application No. 2006-025881, filed Feb. 2, 2006, the contents of both of which are incorporated herein by reference.

BACKGROUND OF THE INVENTION

1. Field of the Invention

The present invention relates to an exhaust heat recovery apparatus for recovering the exhaust heat from a heat engine.

2. Description of the Related Art

An exhaust heat recovery apparatus is available that, using a heat engine, recovers the exhaust heat from an internal combustion engine that is mounted on a vehicle, such as a passenger car, a bus and a truck. As an example of the exhaust heat recovery apparatus used for such a purpose, there is the Stirling engine, which is excellent in theoretical thermal efficiency. Japanese Patent Application Publication No. 2005-113810 (JP-A-2005-113810) discloses a Stirling engine used as an exhaust heat recovery device that recovers the thermal energy of the exhaust gas from an internal combustion engine.

The Stirling engine is prepared separately from the internal combustion engine, and is provided on an exhaust gas passage of the internal combustion engine. The exhaust gas passage of the internal combustion engine is constituted of a primary exhaust gas passage that communicates with a heat exchanger of the Stirling engine, and a bypass exhaust gas passage that circumvents the heat exchanger of the Stirling engine. In addition, an exhaust gas flow rate-changing means for protecting the Stirling engine is provided at a divergence point upstream of the primary exhaust gas passage and the bypass exhaust gas passage.

In the meantime, if the Stirling engine is provided on the exhaust gas passage of the internal combustion engine as shown in JP-A-2005-113810, the temperature of the exhaust gas decreases by the time the exhaust gas discharged from the internal combustion engine reaches the heater of the Stirling engine, which is the exhaust heat recovery means. As a result, the power output from the Stirling engine is decreased, and therefore the exhaust heat recovery efficiency drops. Especially, in the exhaust heat recovery apparatus driven by the low-grade heat source, such as the exhaust gas from an internal combustion engine, the drop in the exhaust heat recovery efficiency due to the drop in the temperature of the exhaust gas, which is the heat source, is large. In addition, if the Stirling engine and the internal combustion engine are prepared separately as shown in JP-A-2005-113810, the flexibility in mounting the engines on a vehicle is reduced.

SUMMARY OF THE INVENTION

In consideration of the above problems, the present invention provides an exhaust heat recovery apparatus that achieves at least one of the following: to inhibit reduction in the power output from an exhaust heat recovery means; and to increase the flexibility in mounting the exhaust heat recovery means on a vehicle.

According to an aspect of the present invention, provided is an exhaust heat recovery apparatus including a heat engine that generates motive power by burning a mixture of fuel and air, and exhaust heat recovery means that recovers thermal energy of an exhaust gas discharged from the heat engine and converts the thermal energy into kinetic energy, the exhaust heat recovery apparatus being characterized in that the heat engine and the exhaust heat recovery means are united into a single structure.

In this exhaust heat recovery apparatus, the exhaust heat recovery means is united with the heat engine, which is the subject from which exhaust heat is recovered, to form a single structure. In this way, it is possible to reduce dimensions of the exhaust heat recovery apparatus, and it is therefore possible to increase the flexibility in mounting the exhaust heat recovery means on the vehicle. In addition, because it is possible to dispose the exhaust heat recovery means very close to the heat engine, it is possible to supply the exhaust gas to the exhaust heat recovery means with the drop in the temperature of the exhaust gas discharged from the heat engine small. As a result, it is possible to inhibit reduction in the power output from the exhaust heat recovery means.

It is also preferable that, in the exhaust heat recovery apparatus, at least a heater of a heat exchanger that the exhaust heat recovery means includes be disposed, in an exhaust gas passage of the heat engine, between an exhaust port through which the heat engine discharges the exhaust gas and a purification catalyst for purifying the exhaust gas.

It is also preferable that, in the exhaust heat recovery apparatus, at least the heater of the heat exchanger that the exhaust heat recovery means includes be disposed in an exhaust manifold, which is connected to the exhaust port, and introduces the exhaust gas discharged from the heat engine into the purification catalyst.

It is also preferable that, in the exhaust heat recovery apparatus, the exhaust manifold and at least the heater of the heat exchanger be united.

It is also preferable that, in the exhaust heat recovery apparatus, a rotation axis of the heat engine and a rotation axis of the exhaust heat recovery means be arranged substantially in parallel.

It is also preferable that, in the exhaust heat recovery apparatus, a central axis of a cylinder of the heat engine and a central axis of a cylinder of the exhaust heat recovery means be arranged in parallel.

It is also preferable that, in the exhaust heat recovery apparatus, a central axis of a cylinder of the heat engine and a central axis of a cylinder of the exhaust heat recovery means be arranged inclined with respect to each other.

It is also preferable that the heat engine be an internal combustion engine that is mounted on a vehicle, and the exhaust heat recovery means be a Stirling engine that is mounted on a vehicle together with the internal combustion engine.

This invention makes it possible to achieve at least one of the following: to inhibit reduction in the power output from an exhaust heat recovery means; and to increase the flexibility in mounting the exhaust heat recovery apparatus on a vehicle.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments. It should be noted that the present invention is not limited to the below-described embodiments for carrying out the invention. The components of the embodiments include ones that those skilled in the art would easily think of, and ones that are substantially the same as the former ones. The description given below illustrates a case where a Stirling engine is used as an exhaust heat recovery means to recover the exhaust heat from an internal combustion engine, which is a heat engine. In addition to the Stirling engine, another exhaust heat recovery device, such as one using the Brayton cycle, may be used as the exhaust heat recovery means.

Distinctive features of these embodiments include that the exhaust heat recovery means is united with a heat engine, which is the subject from which exhaust heat is recovered, to form a single structure, and that a heater of the exhaust heat recovery means is disposed between an exhaust gas outlet of the heat engine and a purification catalyst that purifies the exhaust gas discharged from the heat engine. The exhaust heat recovery apparatus of the first embodiment will be described below. First, the construction of the exhaust heat recovery means of the exhaust heat recovery apparatus of the first embodiment will be described.

Figure 1:
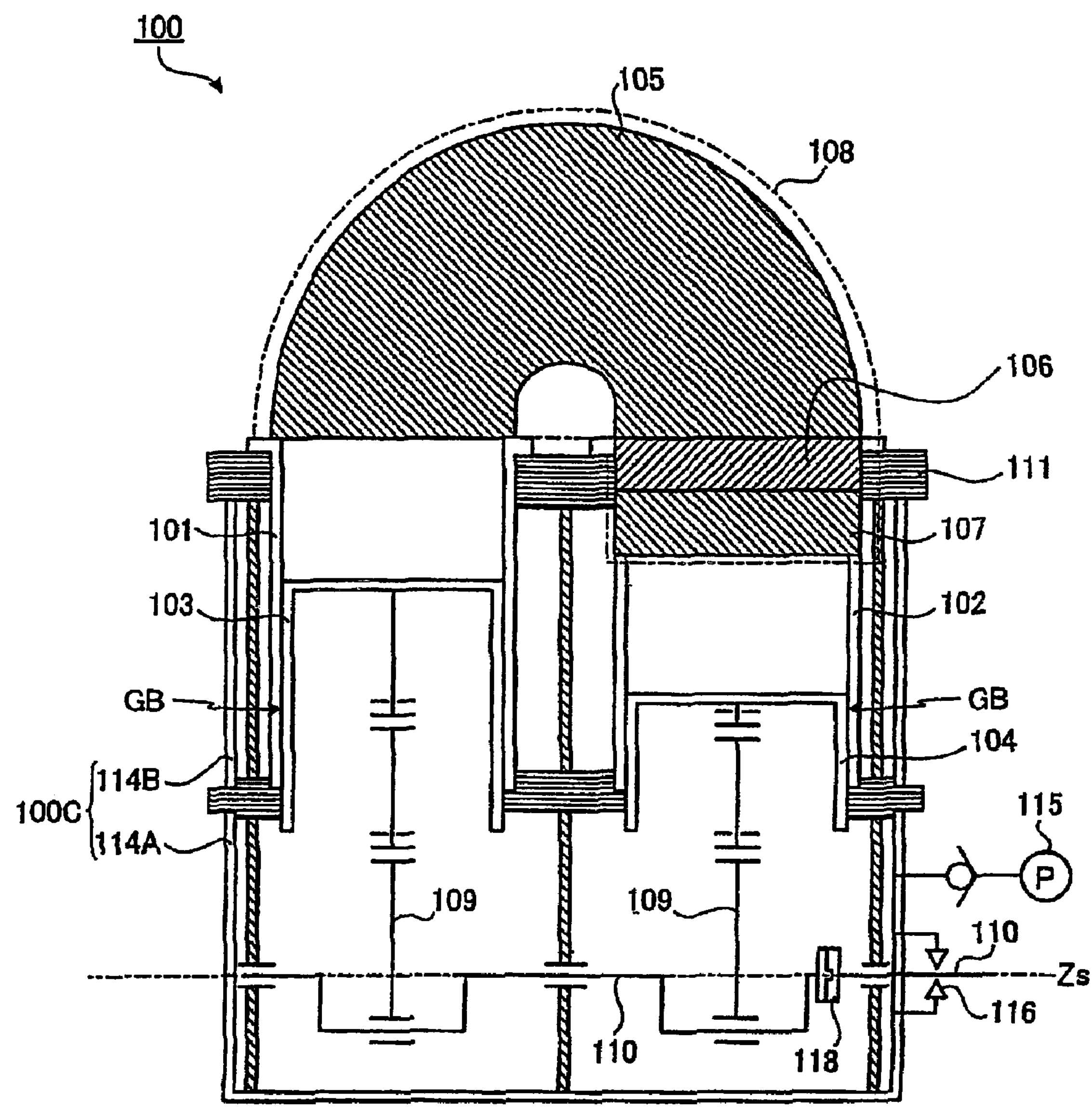
FIG. 1 is a sectional view showing a Stirling engine, which is an exhaust heat recovery means of an exhaust heat recovery apparatus of a first embodiment of the present invention.
Figure 2:
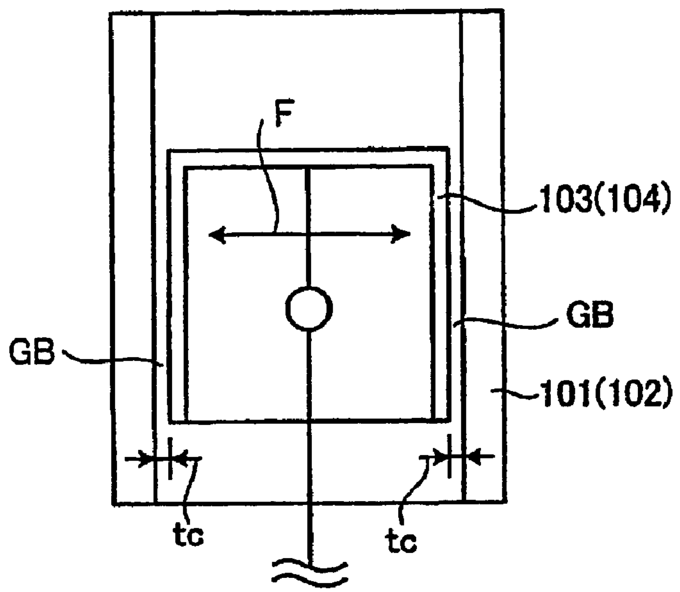
FIG. 2 is a sectional view showing an example of the construction of an air bearing that the Stirling engine includes, which is the exhaust heat recovery means of the exhaust heat recovery apparatus of the first embodiment of the present invention.
Figure 3:
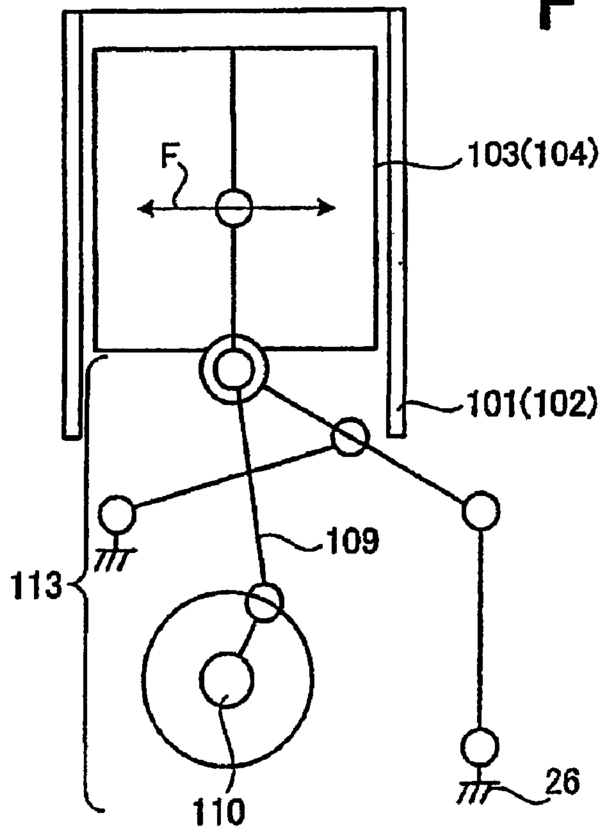
FIG. 3 is an explanatory diagram showing an example of an approximately linear motion linkage, which is used to support a piston.

FIG. 1 is a sectional view showing a Stirling engine, which is an exhaust heat recovery means of an exhaust heat recovery apparatus of the first embodiment. FIG. 2 is a sectional view showing an example of the construction of an air bearing that the Stirling engine includes, which is the exhaust heat recovery means of the first embodiment. FIG. 3 is an explanatory diagram showing an example of an approximately linear motion linkage, which is used to support a piston. The Stirling engine 100, which is the exhaust heat recovery means of the first embodiment, is a so-called a-type in-line two-cylinder Stirling engine. In the Stirling engine 100, a high temperature-side piston 103, which is a first piston, housed in a high temperature-side cylinder 101, which is a first cylinder, and a low temperature-side piston 104, which is a second piston, housed in a low temperature-side cylinder 102, which is a second cylinder, are arranged in an in-line arrangement.

The high temperature-side cylinder 10 and the low temperature-side cylinder 102 are directly or indirectly supported by, or fixed to a base plate 111, which is a reference body. The base plate 111 serves as a positional reference of the components of the Stirling engine 100. With this configuration, it is made possible to ensure the accuracy of the relative position between the components. In addition, as described later, in the Stirling engine 100 of the first embodiment, respective gas bearings GB are interposed between the high temperature-side cylinder 101 and the high temperature-side piston 103, and between the low temperature-side cylinder 102 and the low temperature-side piston 104. By fixing the high temperature-side cylinder 101 and the low temperature-side cylinder 102 directly or indirectly to the base plate 111, which is the reference body, it is possible to maintain the clearance between the piston and the cylinder with precision. Thus, the function of the gas bearings GB is satisfactorily carried out. In addition, it becomes easy to assemble the Stirling engine 100.

A heat exchanger 108 constituted of a substantially U-shaped heater 105, a regenerator 106, and a cooler 107 is disposed between the high temperature-side cylinder 101 and the low temperature-side cylinder 102. One end of the heater 105 is positioned next to the high temperature-side cylinder 101, and the other end thereof is positioned next to the regenerator 106. One end of the regenerator 106 is positioned next to the heater 105, and the other end thereof is positioned next to the cooler 107. One end of the cooler 107 is positioned next to the regenerator 106, and the other end thereof is positioned next to the low temperature-side cylinder 102.

A working fluid (air in this embodiment) is confined in the high temperature-side cylinder 101, the low temperature-side cylinder 102 and the heat exchanger 108, and realizes the Stirling cycle with the heat supplied from the heater 105 and the heat discharged from the cooler 107 to drive the Stirling engine 100. The heater 105 and the cooler 107 may be formed by bundling a plurality of tubes made of a material that has high thermal conductivity and excellent thermal resistance, for example. The regenerator 106 may be made of a porous heat storage unit. The composition of the heater 105, the cooler 107 and the regenerator 106 is not limited to this example. Specifically, the composition may be suitably selected depending on the thermal conditions of the subject from which exhaust heat is recovered, the specifications of the Stirling engine 100, etc.

The high temperature-side piston 103 and the low temperature-side piston 104 are supported in the high temperature-side cylinder 101 and the low temperature-side cylinder 102, respectively, with the respective gas bearings GB interposed therebetween. In other words, the piston is supported in the cylinder without any piston rings. In this way, it is possible to reduce the friction between the piston and the cylinder, and thereby improve the thermal efficiency of the Stirling engine 100. In addition, the reduction in the friction between the piston and the cylinder makes it possible to recover the exhaust heat by operating the Stirling engine 100 even under the operating conditions of a low-temperature heat source and low temperature difference, such as in the case of the exhaust heat recovery of the internal combustion engine.

In order to form the gas bearing GB, as shown in FIG. 2, the clearance tc between the high temperature-side piston 103 and the high temperature-side cylinder 101 is set to a few tens of microns all around the high temperature-side piston 103. The low temperature-side piston 104 and the low temperature-side cylinder 102 have a similar configuration. The high temperature-side cylinder 101, the high temperature-side piston 103, the low temperature-side cylinder 102 and the low temperature-side piston 104 may be made of an easily worked, metallic material, for example.

The reciprocation of the high temperature-side piston 103 and the low temperature-side piston 104 is transmitted to an exhaust heat recovery means-side crankshaft 110 through a connecting rod 109, and converted into rotational motion. The connecting rod 109 may be supported by an approximately linear motion linkage (a grasshopper linkage, for example) 113 shown in FIG. 3. Such a linkage allows the high temperature-side piston 103 and the low temperature-side piston 104 to reciprocate substantially linearly. If the connecting rod 109 is supported by the approximately linear motion linkage 113 in this way, the side force F (the force in the radial direction of the piston) exerted on the high temperature-side piston 103 becomes substantially zero, so that it is possible to satisfactorily support the piston using a gas bearing GB that has a small load capacity.

As shown in FIG. 1, the components of the Stirling engine 100, such as the high temperature-side cylinder 101, the high temperature-side piston 103, the connecting rod 109 and the exhaust heat recovery means-side crankshaft 110, are housed in an exhaust heat recovery means-side housing 100C. The exhaust heat recovery means-side housing 100C includes an exhaust heat recovery means-side crankcase 114A and an exhaust heat recovery means-side cylinder block 114B.

As described later, the exhaust heat recovery means-side housing 100C is incorporated into a common structure integrated with the housing of the heat engine, which is the subject from which exhaust heat is recovered. A pressurizing means 115 increases the pressure in the exhaust heat recovery means-side housing 100C. The purpose of this is to pressurize the working fluid in the high temperature-side cylinder 101, the low temperature-side cylinder 102 and the heat exchanger 108 to obtain more power output from the Stirling engine 100.

In the Stirling engine 100 according to the first embodiment, a sealed bearing 116 is fitted to the exhaust heat recovery means-side housing 100C, and supports the exhaust heat recovery means-side crankshaft 110. The power output from the exhaust heat recovery means-side crankshaft 110 is output from the exhaust heat recovery means-side housing 100C through a flexible coupling 118. An Oldham's coupling is used as the flexible coupling 118 in the first embodiment. Next, the construction of the exhaust heat recovery apparatus including the Stirling engine 100 as the exhaust heat recovery means will be described.

Figure 4:
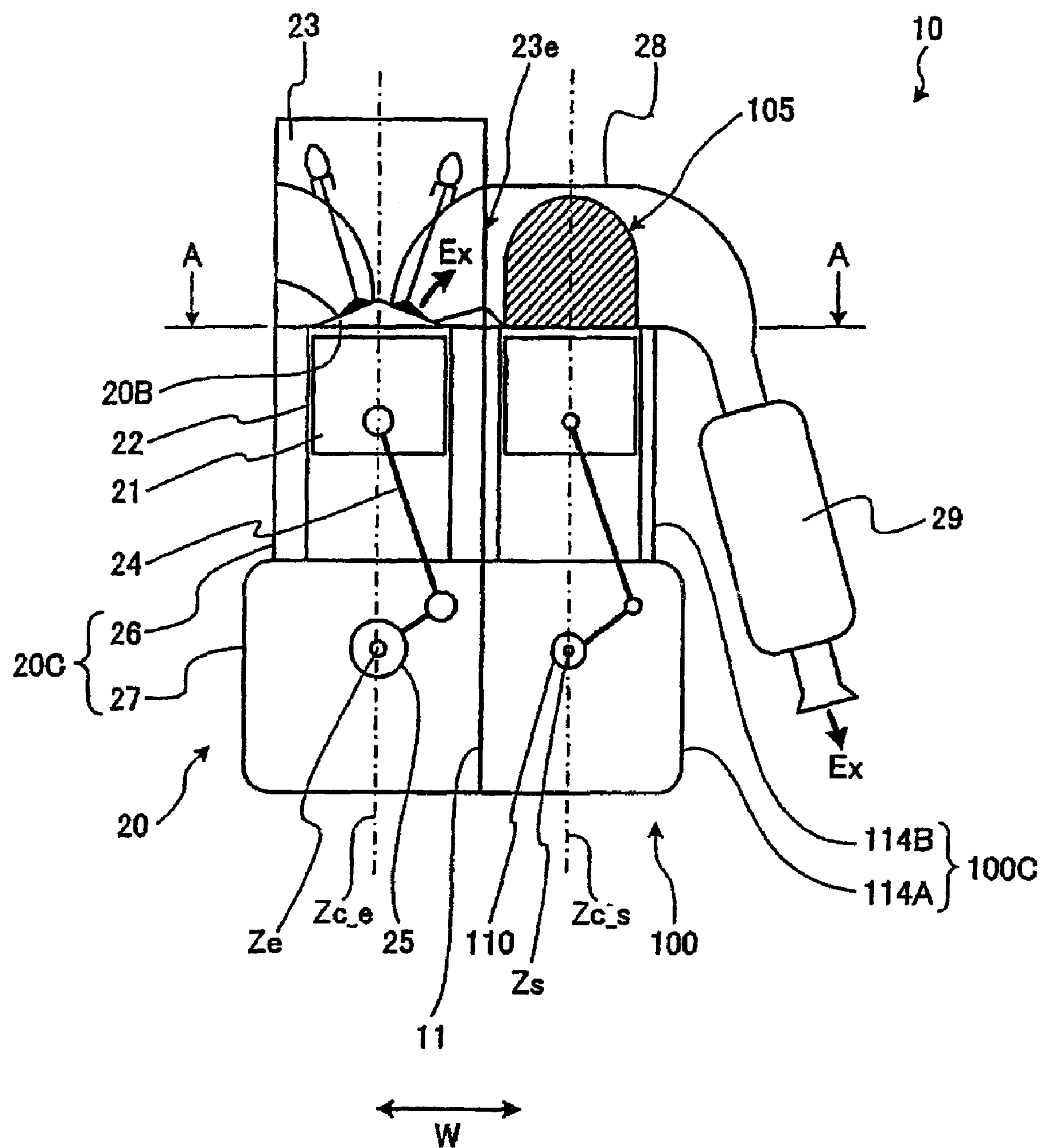
FIG. 4 is an explanatory diagram (front view) showing a configuration of the exhaust heat recovery apparatus of the first embodiment of the present invention.
Figure 5:
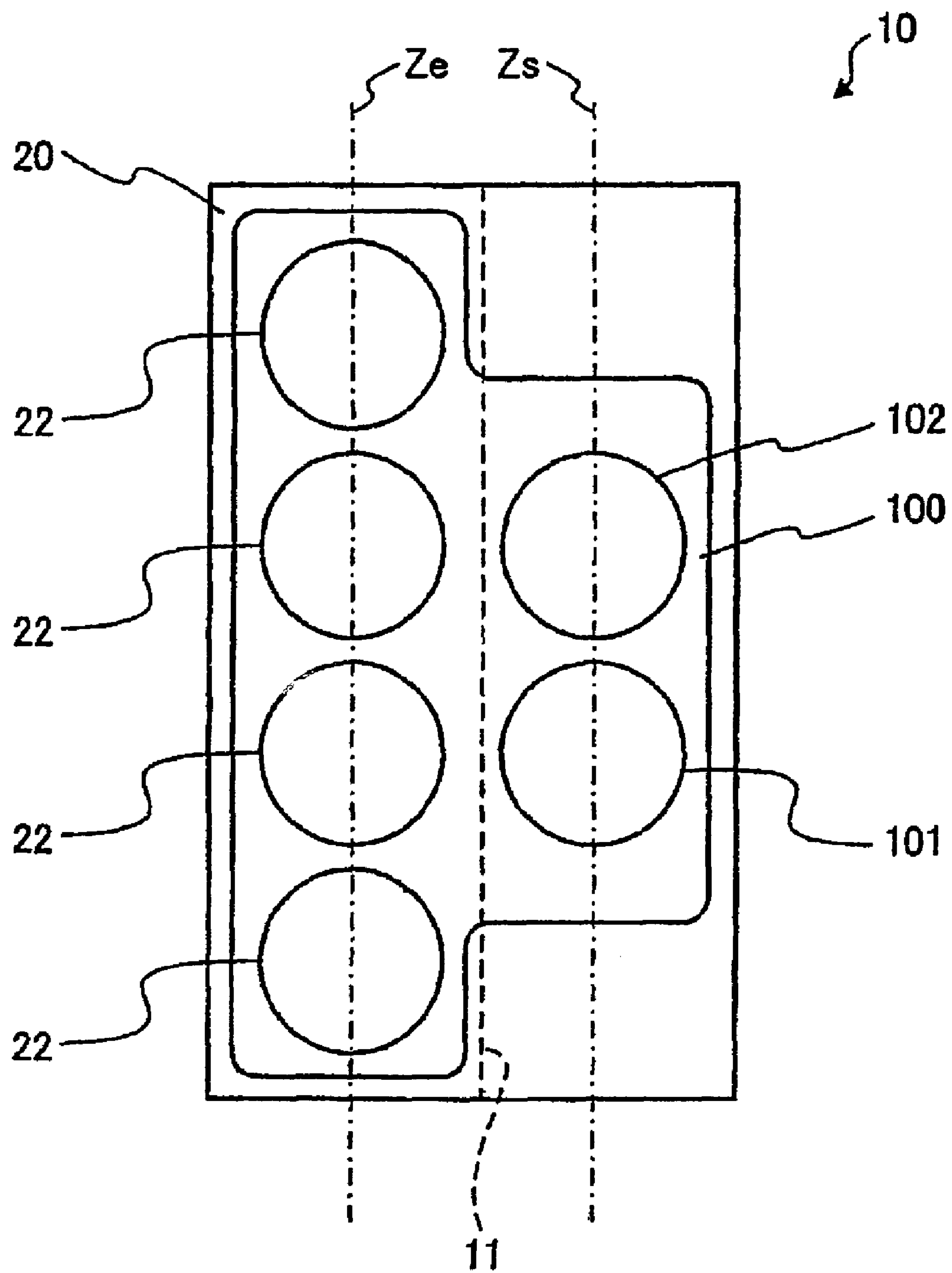
FIG. 5 is an explanatory diagram (plan view) showing a configuration of the exhaust heat recovery apparatus of the first embodiment of the present invention.
Figure 6:
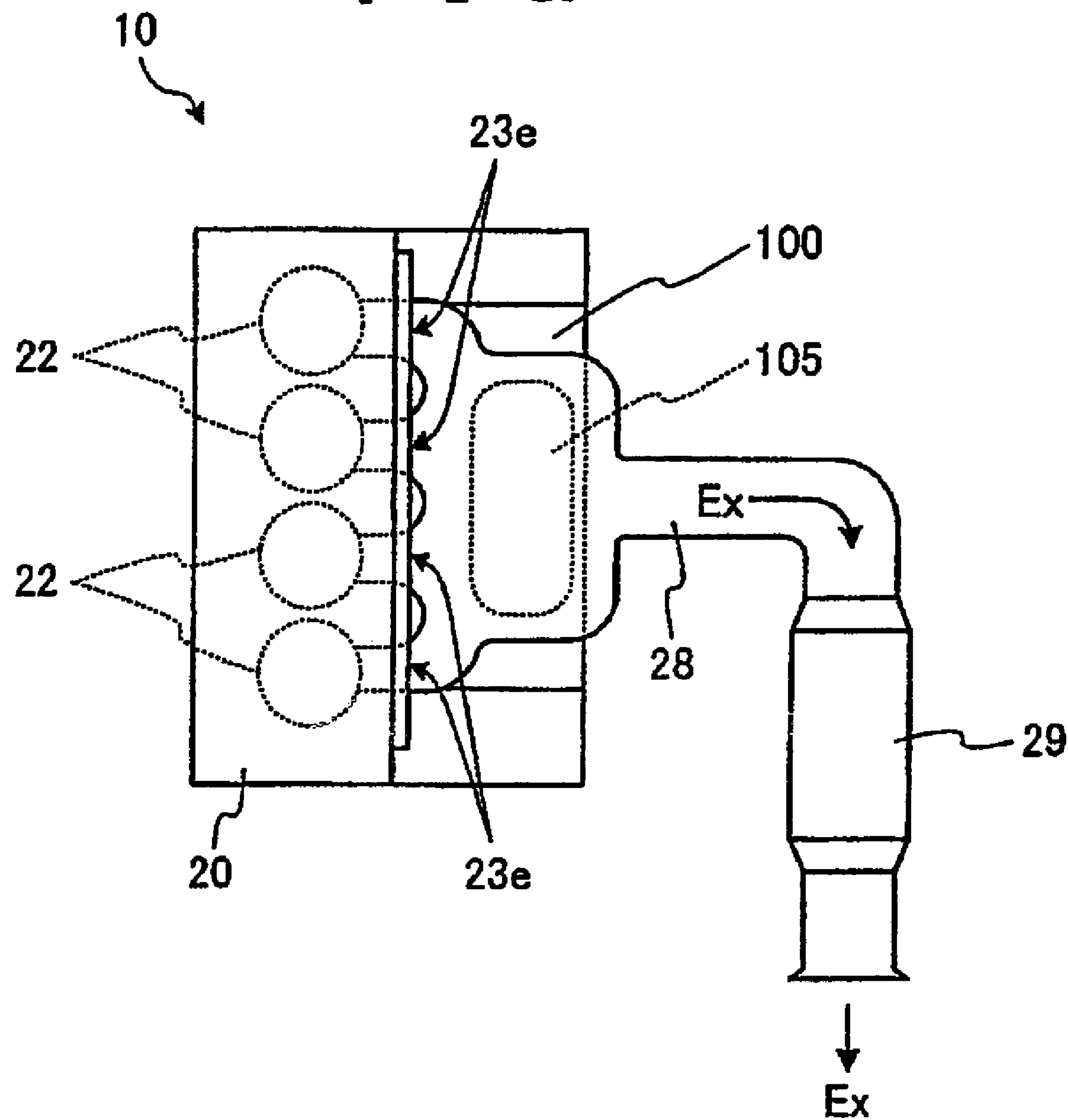
FIG. 6 is an explanatory diagram (plan view) showing a configuration of the exhaust heat recovery apparatus of the first embodiment of the present invention.

FIGS. 4 to 6 are explanatory diagrams showing the construction of the exhaust heat recovery apparatus according to the first embodiment. FIG. 4 is a front view of the exhaust heat recovery apparatus, and FIGS. 5 and 6 are plan views thereof. The exhaust heat recovery apparatus 10 according to the first embodiment is formed in one body by uniting the Stirling engine 100, which is the exhaust heat recovery means, and an internal combustion engine 20, or the heat engine, which is the subject from which exhaust heat is recovered. The internal combustion engine 20 is a reciprocating internal combustion engine. A plurality of cylinders 22 (four cylinders in this embodiment), in which pistons 21 reciprocate, are arranged in an in-line arrangement. The internal combustion engine 20 may be either a spark-ignited engine or a diesel engine. The ignition mechanism is arbitrary. In addition, the number and the arrangement of the cylinder 22 are also arbitrary.

The cylinders 22 are disposed in a heat engine-side cylinder block 26 of the internal combustion engine 20. The combustion of the mixture of air and fuel in combustion chambers 20B causes the pistons 21 to reciprocate in the cylinders 22. The reciprocating motion of the pistons 21 is transmitted to a heat engine-side crankshaft 25 through a connecting rod 24, and converted into rotational motion. The cylinders 22 are provided in a heat engine-side cylinder block 26. The heat engine-side crankshaft 25 is disposed in a heat engine-side crankcase 27. A heat engine-side housing 20C of the internal combustion engine 20 includes the heat engine-side cylinder block 26 and the heat engine-side crankcase 27.

As described above, the exhaust heat recovery apparatus 10 according to the first embodiment is formed by uniting the Stirling engine 100, which is the exhaust heat recovery means, and the internal combustion engine 20 into one body. Thus, in the exhaust heat recovery apparatus 10 according to the first embodiment, the Stirling engine 100 and the internal combustion engine 20 are treated as one structure.

In the exhaust heat recovery apparatus 10 according to the first embodiment, the exhaust heat recovery means-side housing 100C of the Stirling engine 100, and the heat engine-side housing 20C of the internal combustion engine 20 are united to obtain an exhaust heat recovery apparatus housing in which the above two housings are united. Thus, in the exhaust heat recovery apparatus 10 according to the first embodiment, the Stirling engine 100 and the internal combustion engine 20 are treated as one structure. These engines have already been united into an inseparable structure when at least one of the internal combustion engine 20 and the Stirling engine 100 is operated.

In uniting the exhaust heat recovery means-side housing 100C and the heat engine-side housing 20C into one body, there is no need to unite all components thereof into a single structure. In other words, part of the components thereof may be united into a single structure. For example, the exhaust heat recovery means-side crankcase 114A and the heat engine-side crankcase 27 are manufactured in the form of a single structure. Needless to say, the exhaust heat recovery means-side cylinder block 114B and the heat engine-side cylinder block 26 may be manufactured in the form of a single structure. In addition, the exhaust heat recovery means-side crankcase 114A and the heat engine-side crankcase 27, which are manufactured in the form of a single structure, as well as the exhaust heat recovery means-side cylinder block 114B and the heat engine-side cylinder block 26, which are manufactured in the form of a single structure, may be united into one body to obtain the housing of the exhaust heat recovery apparatus 10.

As a method of uniting the Stirling engine 100 and the internal combustion engine 20, there is a method in which the exhaust heat recovery means-side housing 100C and the heat engine-side housing 20C, for example, are manufactured in the form of a single structure by casting, for example. Other methods may also be used in which the exhaust heat recovery means-side housing 100C and the heat engine-side housing 20C are prepared separately, and are united by fastening these housings together using fastening means, such as bolts, or by a joining method, such as welding.

It suffices that the exhaust heat recovery apparatus 10 according to the first embodiment is in the form of a single structure when at least one of the internal combustion engine 20 and the Stirling engine 100 is in operation. Accordingly, with regard to the first embodiment, the exhaust heat recovery apparatus 10 that is constructed by uniting the Stirling engine 100 and the internal combustion engine 20 using any one of the above methods falls within the concept of the single structure.

If the exhaust heat recovery apparatus 10 is formed by uniting the Stirling engine 100 and the internal combustion engine 20 into one body in this way, the exhaust heat recovery apparatus 10 is made compact in size. As a result, the flexibility in disposing the exhaust heat recovery apparatus 10 including the internal combustion engine 20 when the exhaust heat recovery apparatus 10 is mounted on a vehicle, is increased. In addition, even when the Stirling engine 100 is used as an auxiliary (as a water pump, for example) of the internal combustion engine 20, the auxiliary is disposed near the internal combustion engine 20, which makes it possible to shorten the wiring and the piping connecting between the auxiliary and the internal combustion engine 20.

In the Stirling engine 100, which is the exhaust heat recovery means, the pressure in the exhaust heat recovery means-side housing 100C is increased as described above. Accordingly, when the Stirling engine 100 is in operation, that is, when the exhaust heat is recovered, the average pressure in the exhaust heat recovery means-side housing 100C is higher than the average pressure in the heat engine-side housing 20C. For this reason, in order to prevent the pressure in the exhaust heat recovery means-side housing 100C from leaking into the heat engine-side housing 20C, the inside of the exhaust heat recovery means-side housing 100C and the inside of the heat engine-side housing 20C are separated by a separating means (a partition plate) 11. In this way, the inside of the exhaust heat recovery means-side housing 100C and the inside of the heat engine-side housing 20C are treated as separate spaces. Thus, it is possible to regulate the pressure in the exhaust heat recovery means-side housing 100C and the pressure in the heat engine-side housing 20C independently.

The exhaust heat recovery apparatus 10 according to the first embodiment recovers the thermal energy of the exhaust gas Ex discharged from the internal combustion engine 20 in the form of the power output from the Stirling engine 100. The exhaust gas Ex is discharged from the combustion chamber 20B of the internal combustion engine 20 through exhaust ports 23*e* provided in a cylinder head 23 of the internal combustion engine 20, and an exhaust manifold 28 that is connected to the exhaust ports 23*e*. The exhaust manifold 28 provides exhaust gas passages through which the exhaust gas Ex discharged from the combustion chambers 20B of the internal combustion engine 20 is passed. The exhaust manifold 28 is connected to a purification catalyst 29, and the exhaust gas Ex discharged from the internal combustion engine 20 is discharged into the atmosphere after unburned HC, CO, etc. are removed by the purification catalyst 29.

The exhaust heat recovery apparatus 10 according to the first embodiment is provided with the heater 105 that the heat exchanger 108 (see FIG. 1) of the Stirling engine 100 includes, in the inside of the exhaust gas passage between the exhaust ports 23*e* of the internal combustion engine 20 and the purification catalyst 29. In this embodiment, the inside of the exhaust manifold 28 corresponds to the inside of the exhaust gas passage between the exhaust ports 23*e* of the internal combustion engine 20 and the purification catalyst 29. The central axis Zc_e of the cylinder of the internal combustion engine 20 and the central axis Zc_s of the cylinder of the Stirling engine 100 are arranged substantially in parallel. In this way, it is possible to dispose the Stirling engine 100 as close as possible to the internal combustion engine 20. Thus, the Stirling engine 100 is driven by the exhaust gas Ex when the exhaust gas Ex has the highest temperature immediately after the exhaust gas Ex is discharged from the combustion chamber 20B of the internal combustion engine 20, so that it is possible to inhibit reduction in the power output from the Stirling engine 100, that is, the exhaust heat recovery apparatus 10.

The heater 105 that the Stirling engine 100 according to the first embodiment includes has a substantially U shape, and therefore can be easily disposed even in a relatively narrow space, such as in the exhaust manifold 28. In addition to the heater 105, the regenerator 106 (see FIG. 1) that the heat exchanger 108 includes may be disposed in the exhaust gas passage (in the exhaust manifold 28) between the exhaust ports 23*e* of the internal combustion engine 20 and the purification catalyst 29.

When the exhaust heat recovery apparatus 10 including the internal combustion engine 20 and the Stirling engine 100 according to the first embodiment is mounted on a vehicle, the cooler 107 that the heat exchanger 108 of the Stirling engine 100 is cooled by the coolant of the internal combustion engine 20. Because the exhaust heat recovery apparatus 10 according to the first embodiment is formed by uniting the Stirling engine 100 and the internal combustion engine 20 into one body, the cooler 107 is disposed near the internal combustion engine 20. Thus, it is possible to minimize the length of the coolant channel for introducing the coolant of the internal combustion engine 20 into the cooler 107. As a result, it is possible to minimize the pressure loss caused by the coolant channel.

In the exhaust heat recovery apparatus 10 according to the first embodiment, the heat engine-side crankshaft 25, which is the output shaft of the internal combustion engine 20, and the exhaust heat recovery means-side crankshaft 110, which is the output shaft of the Stirling engine 100 are arranged in parallel. In other words, the rotation axis Ze (with respect to the rotation of the internal combustion engine) of the heat engine-side crankshaft 25 and the rotation axis Zs (with respect to the rotation of the Stirling engine) of the exhaust heat recovery means-side crankshaft 110 are arranged in parallel. Thus, it is possible to inhibit the increase in the dimension in the width direction (the direction perpendicular to the exhaust heat recovery means-side crankshaft 110, that is, the direction shown by the arrow W in FIGS. 4 and 5) of the exhaust heat recovery apparatus 10.

Because the exhaust heat recovery means-side crankshaft 110 and the heat engine-side crankshaft 25 are parallel, the exhaust heat recovery apparatus has an advantage that a relatively simple structure suffices when the power output from the exhaust heat recovery means-side crankshaft 110 is output through the heat engine-side crankshaft 25. For example, if the exhaust heat recovery means-side crankshaft 110 and the heat engine-side crankshaft 25 were arranged orthogonally to each other, it would be necessary to once change the direction of the power output of the exhaust heat recovery means-side crankshaft 110 by 90 degrees, which is unnecessary when these shafts are arranged in parallel.

In the Stirling engine 100, which is an exhaust heat recovery means, flexibility in arranging the heater 105 is restricted. In particular, when the subject from which exhaust heat is recovered is an internal combustion engine that is mounted on a vehicle, the degree to which the flexibility in arranging the heater 105 is restricted becomes greater. For this reason, it is necessary to mount the Stirling engine 100 as close as possible to the internal combustion engine 20, which is the subject from which exhaust heat is recovered, in order to use the exhaust gas Ex at higher temperatures. The exhaust gas Ex has the highest temperature immediately after the exhaust gas Ex is discharged from the exhaust ports 23*e* of the internal combustion engine 20, and therefore, in order to use this exhaust gas Ex, the heater 105 of the Stirling engine 100 has to be disposed as close as possible to the internal combustion engine 20.

In order to carry out such disposition, the exhaust heat recovery apparatus 10 according to the first embodiment is formed by uniting the internal combustion engine 20 and the Stirling engine 100 into a single structure, whereby a cylinder of the internal combustion engine 20 and the adjacent cylinder of the Stirling engine 100 are disposed as close as possible to each other. In this way, the heat engine-side crankshaft 25, which is the output shaft of the internal combustion engine 20, and the exhaust heat recovery means-side crankshaft 110, which is the output shaft of the Stirling engine 100 are arranged substantially in parallel, and the heater 105 of the Stirling engine 100 is disposed in the exhaust manifold 28 of the internal combustion engine 20. As a result, it is possible to recover the thermal energy of the exhaust gas Ex having a high temperature immediately after the exhaust gas Ex is discharged from the exhaust ports 23*e* of the internal combustion engine 20 even if the internal combustion engine 20, which is the subject from which exhaust heat is recovered, is mounted on an object, such as a vehicle, in which the flexibility in arranging the heater 105 is very restricted.

Figure 7:
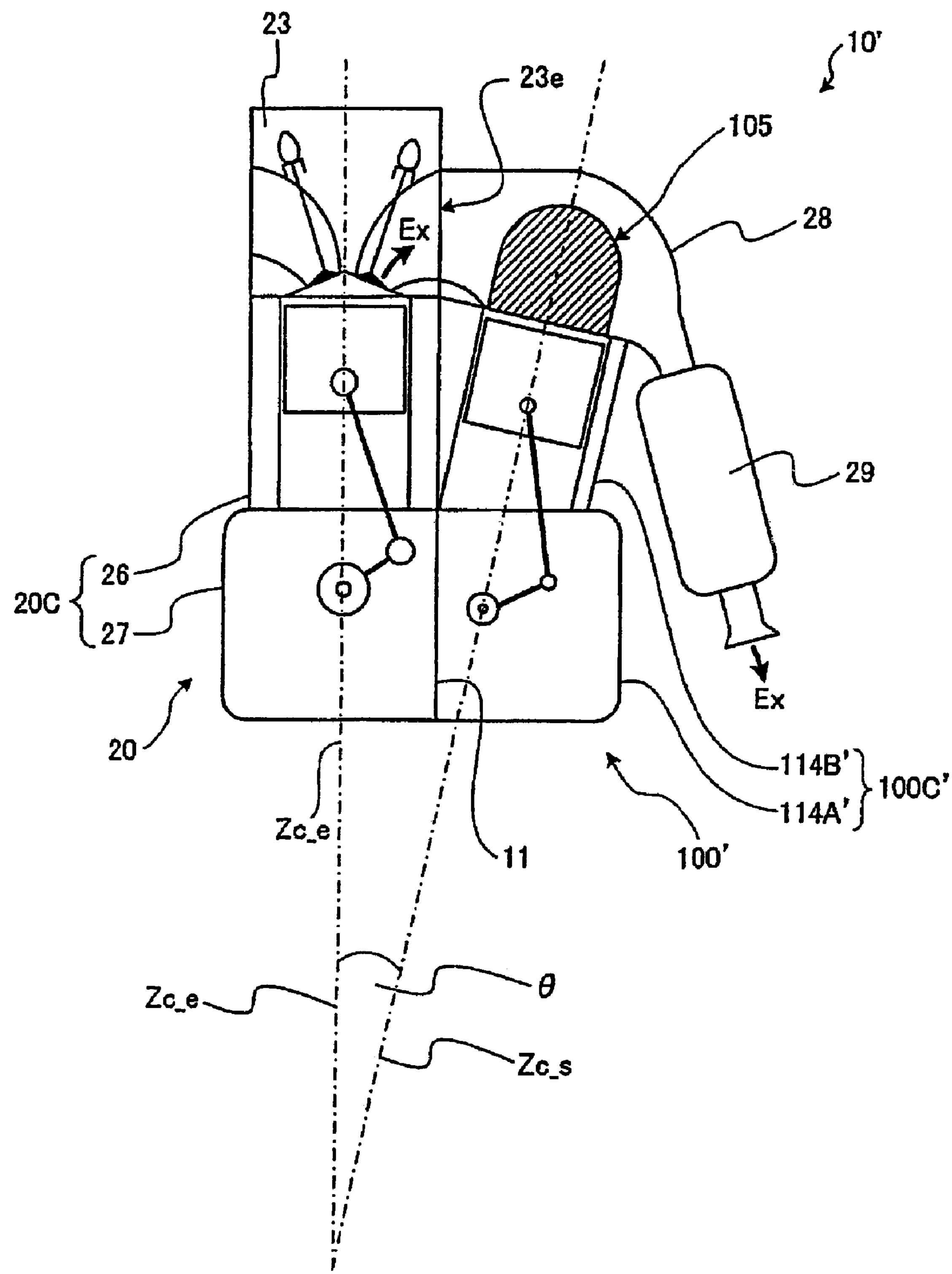
FIG. 7 is an explanatory diagram showing a configuration of an exhaust heat recovery apparatus of a second embodiment of the present invention.

FIG. 7 is an explanatory diagram showing an exhaust heat recovery apparatus according to a second embodiment of the present invention. The exhaust heat recovery apparatus 10' is substantially the same as the exhaust heat recovery apparatus 10 (see FIG. 4), except that the central axis Zc_e of a cylinder of the internal combustion engine 20 and the central axis Zc_s of the adjacent cylinder of a Stirling engine 100' are inclined with respect to each other.

In the exhaust heat recovery apparatus 10', the central axis Zc_e of a cylinder of the internal combustion engine 20 and the central axis Zc_s of the adjacent cylinder of the Stirling engine 100' are inclined with respect to each other by a predetermined angle?. Thus, an exhaust heat recovery means-side cylinder block 114B' constituting an exhaust heat recovery means-side housing 100C' of the Stirling engine 100', and the heat engine-side cylinder block 26 constituting the heat engine-side housing 20C of the internal combustion engine 20 are arranged inclined with respect to each other by a predetermined angle?.

With this configuration, it is possible to increase the distance between the exhaust ports 23*e* of the internal combustion engine 20 and the heater 105 of the Stirling engine 100'. As a result, even if it is difficult to dispose the heater 105 in the exhaust manifold 28 when the exhaust ports 23*e* of the internal combustion engine 20 and the heater 105 of the Stirling engine 100' are very close to each other, it is easy to dispose the heater 105 in the exhaust manifold 28.

Figure 8:
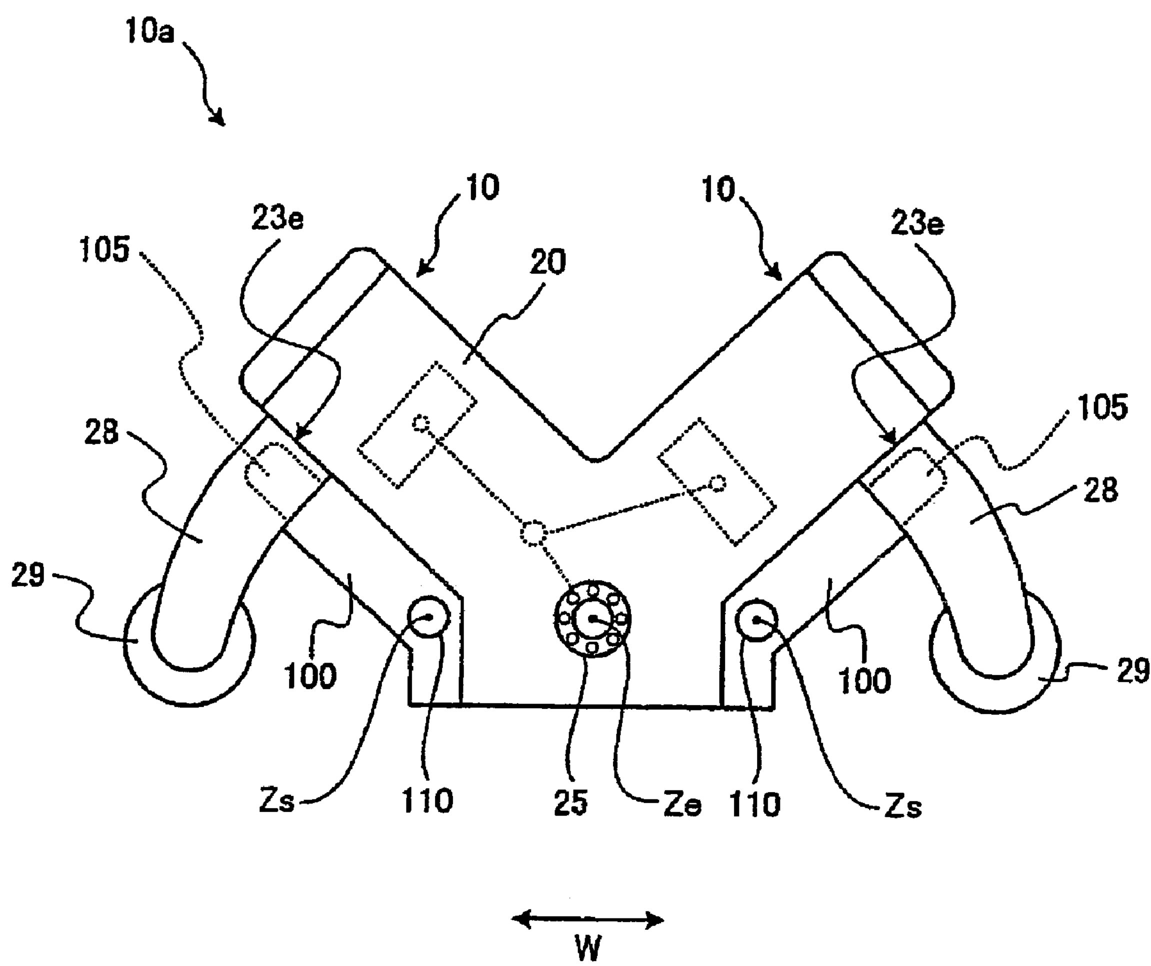
FIG. 8 is an explanatory diagram (front view) showing a configuration of an exhaust heat recovery apparatus of a third embodiment of the present invention.
Figure 9:
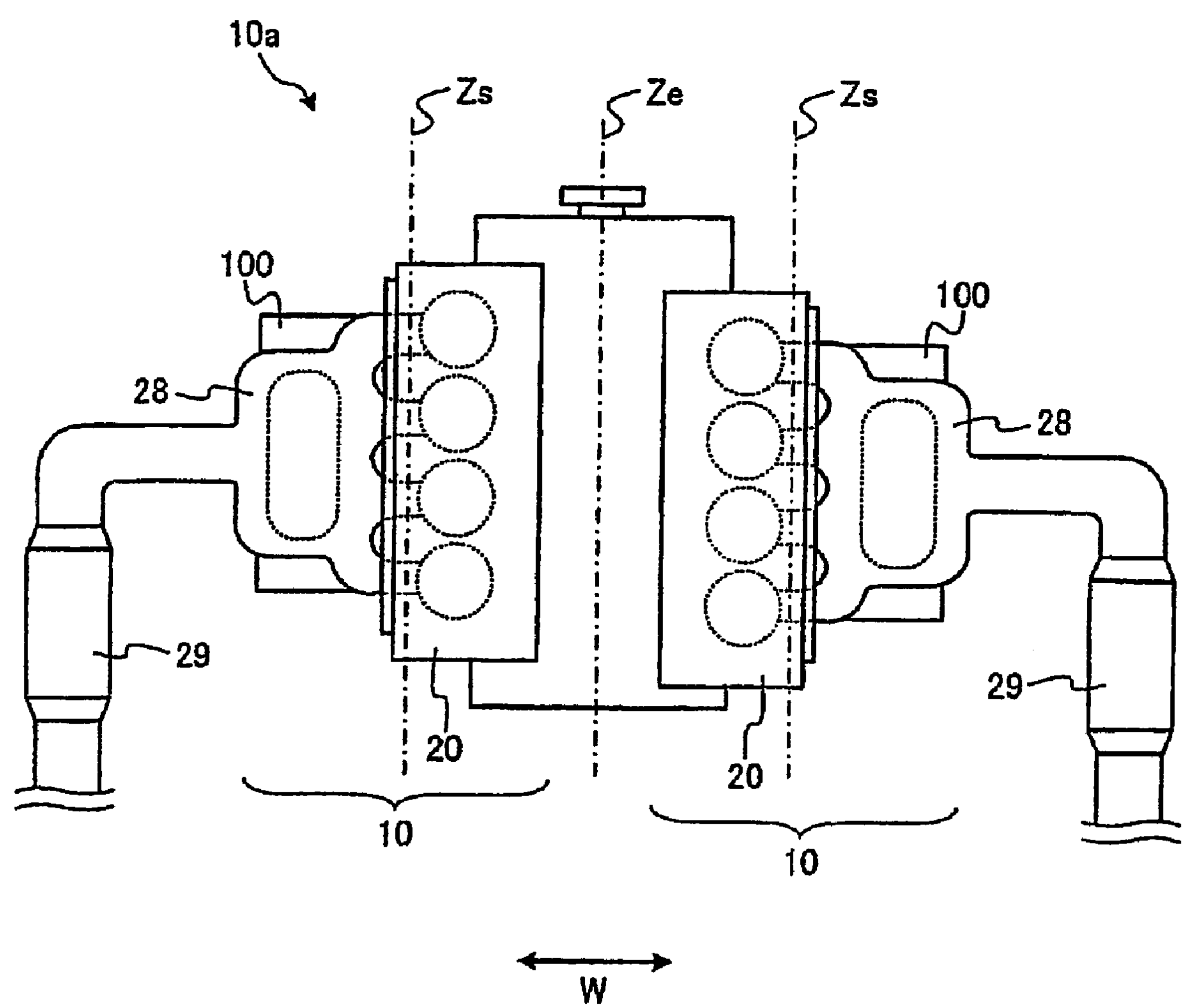
FIG. 9 is an explanatory diagram (plan view) showing a configuration of the exhaust heat recovery apparatus of the third embodiment of the present invention.

FIGS. 8 and 9 are explanatory diagrams showing an exhaust heat recovery apparatus according to a third embodiment of the present invention. FIGS. 8 and 9 are a front view and a plan view, respectively. The exhaust heat recovery apparatus 10*a* is formed by combining two exhaust heat recovery apparatuses 10 (see FIGS. 4 to 6) in a V shape when viewed along the direction of the internal combustion engine-side rotation axis Ze. That is, the cylinders of the internal combustion engine 20 are arranged in a V shape.

In this case, the exhaust ports 23*e* and the exhaust manifolds 28 of the internal combustion engine 20 are provided on the outer sides of the exhaust heat recovery apparatus 10*a* in the width direction thereof, so that the Stirling engines 100 are also provided on the outer sides of the exhaust heat recovery apparatus 10*a* in the width direction thereof. In the exhaust heat recovery apparatus 10*a* shown in FIG. 8, the exhaust heat recovery means-side crankshaft 110 and the heat engine-side crankshaft 25 are arranged in parallel. Thus, even if two exhaust heat recovery apparatuses 10 are arranged in a V shape, it is possible to keep small the increase in the dimension of the exhaust heat recovery apparatus 10*a* in the width direction thereof (the direction shown by the arrow W in FIGS. 8 and 9).

In the third embodiment, the exhaust heat recovery apparatus 10 is a unit constituted of the Stirling engine 100 and the internal combustion engine 20 in which the heat engine-side crankshaft 25 and the exhaust heat recovery means-side crankshaft 110 are arranged in parallel. With this configuration, development can be carried out using the exhaust heat recovery apparatus 10 as a basic apparatus, and it is therefore relatively easy to cope with the change in the arrangement of the cylinders of the internal combustion engine, for example.

Figure 10:
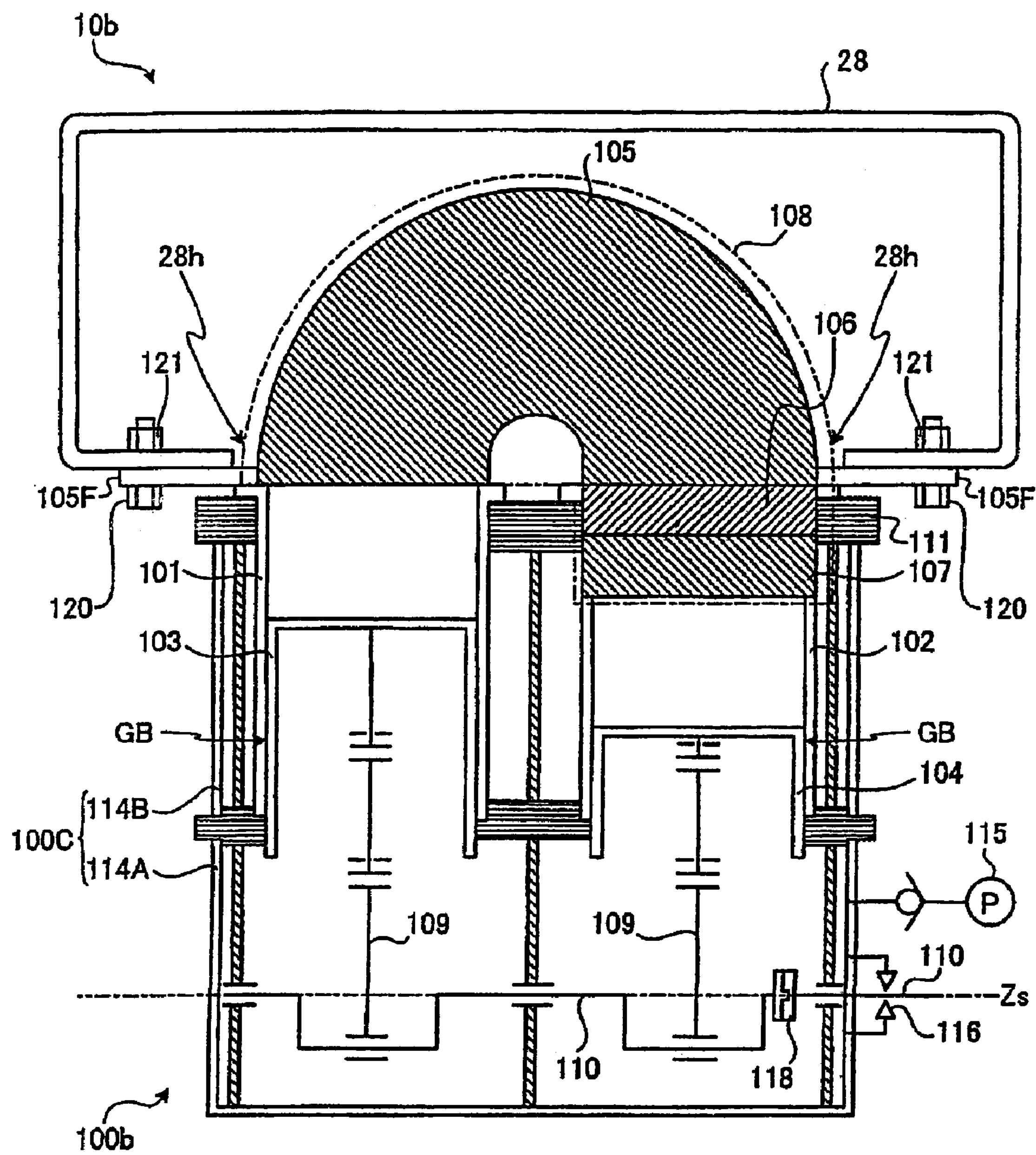
FIG. 10 is a sectional view showing an exhaust heat recovery means that an exhaust heat recovery apparatus according to a modified example of the first to third embodiments includes.

FIG. 10 is a sectional view showing an exhaust heat recovery means that an exhaust heat recovery apparatus of a modified example of the first to third embodiments described above includes. The exhaust heat recovery apparatus 10*b* has substantially the same construction as the above exhaust heat recovery apparatus 10, except that the exhaust manifold 28, which constitutes the exhaust gas passage, and the heater (heat receiving means) 105 that the heat exchanger 108 of a Stirling engine 100*b*, which is an exhaust heat recovery means, includes. In the other points, the exhaust heat recovery apparatus 10*b* is similar to the exhaust heat recovery apparatus 10.

The heater 105 that the Stirling engine, 100*b* includes is provided with a flange 105F on each of the high temperature-side cylinder 101 side and the regenerator 106 side thereof. The exhaust manifold 28 is provided with an opening 28*h* through which the heater 105 is inserted into the exhaust manifold 28. The heater 105 is disposed in the exhaust manifold 28 through the opening 28*h*. It should be noted that it suffices that at least the beater 105 is disposed in the exhaust manifold 28. The regenerator 106 of the heat exchanger 108 may also be disposed in the exhaust manifold 28.

The exhaust manifold 28 and the heater 105 are joined by fastening the exhaust manifold 28 and the flange 105F of the heater 105 together using bolts 120 and nuts 121, which are fastening means. A gasket as a sealing means is provided between the flange 105F and the exhaust manifold 28.

The heater 105 is connected to the high temperature-side cylinder 101 and the regenerator 106 with respective gaskets as sealing means interposed between the heater 105 and the high temperature-side cylinder 101, and between the heater 105 and the regenerator 106. If at least the heater 105 of the Stirling engine 100*b*, which is an exhaust heat recovery means, is united with the exhaust manifold of the internal combustion engine, which is the subject from which exhaust heat is recovered as in the case of this modified example, the operation needed to attach or detach the exhaust manifold 28 to or from the internal combustion engine and the Stirling engine 100*b* becomes easy.

As described above, in the first to third embodiments, the exhaust heat recovery means and the heat engine, which is the subject from which exhaust heat is recovered, are united to form an exhaust heat recovery apparatus in the form of a single structure. In this way, it is possible to make the exhaust heat recovery apparatus compact, and thus, the flexibility in arranging the exhaust heat recovery apparatus including the heat engine and the exhaust heat recovery means when the exhaust heat recovery apparatus is mounted on a vehicle is increased.

In addition, the heater of the exhaust heat recovery means is disposed between the exhaust gas outlets of the heat engine and the purification catalyst for purifying the exhaust gas discharged from the heat engine. With this configuration, the exhaust heat recovery means is driven by the exhaust gas when the exhaust gas has the highest temperature immediately after the exhaust gas is discharged from the heat engine, so that it is possible to inhibit reduction in the power output from the exhaust heat recovery means.

In addition, in the first to third embodiments, the internal combustion engine, which is the subject from which exhaust heat is recovered, is mounted on a vehicle as a motive power source, and the Stirling engine, which is an exhaust heat recovery means, is united with the internal combustion engine, and is mounted on the same vehicle. In this way, it is possible to drive the Stirling engine using the exhaust gas when the exhaust gas has the highest temperature immediately after the exhaust gas is discharged from the combustion chamber of the internal combustion engine, so that it is possible to obtain more power output from the Stirling engine. In addition, it is possible to make the Stirling engine and the internal combustion engine compact by uniting these engines. Accordingly, mountability of the Stirling engine is ensured even under conditions in which the flexibility in mounting the Stirling engine is severely restricted, such as in the case of vehicles.

As described above, the exhaust heat recovery apparatus according to the present invention is useful to recover the exhaust heat of a heat engine or the like, and is especially suitable for inhibiting reduction in the power output from the exhaust heat recovery means.

The invention claimed is:

1. An exhaust heat recovery apparatus comprising:
- a heat engine that generates motive power by burning a mixture of fuel and air, the heat engine including a row of cylinders associated with a first crankshaft;
- a manifold for exhaust gases of the heat engine, the manifold being associated with an upper portion of the row of cylinders; and
- an exhaust heat recovery device that recovers thermal energy of an exhaust gas discharged from the heat engine, converts the thermal energy into kinetic energy,
- wherein the exhaust heat recovery device includes a heater and at least one cylinder,
- wherein the heat engine and the exhaust heat recovery device are united into a single structure, and said heater is disposed inside a central portion of said manifold on the side of said row,
- wherein the exhaust heat recovery device is associated with a second crankshaft, and an upper portion of the exhaust heat recovery device is connected to the manifold for the exhaust gases,
- wherein the first crankshaft is different from the second crankshaft,
- wherein the heater of the exhaust heat recovery device extends into the manifold via a downward facing opening of the manifold,
- wherein the downward facing opening encircles an upper portion of the at least one cylinder of the exhaust heat recovery device,
- wherein an exhaust heat recovery device-side housing and a heat engine-side housing are united, and
- wherein a partition separates an inside of the exhaust heat recovery device-side housing and an inside of the heat engine-side housing from one another such that a pressure in the exhaust heat recovery device-side housing and a pressure in the heat engine-side housing are isolated from one another.

2. The exhaust heat recovery apparatus according to claim 1, wherein in an exhaust gas passage of the heat engine, at least the heater is disposed between an exhaust port through which the heat engine discharges the exhaust gas and a purification catalyst for purifying the exhaust gas.

3. The exhaust heat recovery apparatus according to claim 2, wherein at least the heater is disposed in an exhaust manifold, which is connected to the exhaust port, and introduces the exhaust gas discharged from the heat engine into the purification catalyst.

4. The exhaust heat recovery apparatus according to claim 3, wherein the exhaust manifold and at least the heater are united.

5. The exhaust heat recovery apparatus according to claim 1, wherein a rotation axis of the heat engine and a rotation axis of the exhaust heat recovery device are arranged substantially in parallel.

6. The exhaust heat recovery apparatus according to claim 5, wherein a rotation axis of the heat engine and a rotation axis of the exhaust heat recovery device are arranged substantially in parallel, one next to the other.

7. The exhaust heat recovery apparatus according to claim 1, wherein a central axis of a cylinder of the heat engine and a central axis of a cylinder of the exhaust heat recovery device are arranged in parallel.

8. The exhaust heat recovery apparatus according to claim 7, wherein a central axis of a cylinder of the heat engine and a central axis of a cylinder of the exhaust heat recovery device are arranged substantially in parallel, one next to the other.

9. The exhaust heat recovery apparatus according to claim 1, wherein a central axis of a cylinder of the heat engine and a central axis of a cylinder of the exhaust heat recovery device are arranged inclined with respect to each other.

10. The exhaust heat recovery apparatus according to claim 1, wherein the heat engine is an internal combustion engine that is mounted on a vehicle, and
- wherein the exhaust heat recovery device is a Stirling engine that is mounted on a vehicle together with the internal combustion engine.

11. The exhaust heat recovery apparatus according to claim 1, wherein the heater which the exhaust heat recovery device includes has a substantially U-shape.

12. An exhaust heat recovery apparatus comprising:
- a heat engine that generates motive power by burning a mixture of fuel and air, the heat engine including a row of cylinders, and an exhaust manifold associated with an upper portion of the row of cylinders;
- a first crankshaft associated with the row of cylinders; and
- an exhaust heat recovery device that recovers thermal energy of an exhaust gas discharged from the heat engine and converts the thermal energy into kinetic energy, the exhaust heat recovery device comprising at least one cylinder;
- wherein the heat engine and the exhaust heat recovery device are united into a single structure, and the exhaust heat recovery device is provided near said row of cylinders, on the side of the exhaust heat recovery apparatus in a direction perpendicular to the crankshaft direction,
- wherein the exhaust heat recovery device is associated with a second crankshaft, and an upper portion of the exhaust heat recovery device is connected to the exhaust manifold,
- wherein the first crankshaft is different from the second crankshaft, and
- wherein the exhaust heat recovery device extends into the exhaust manifold via a downward facing opening of the exhaust manifold,
- wherein the downward facing opening encircles an upper portion of the at least one cylinder of the exhaust heat recovery device, wherein an exhaust heat recovery device-side housing and a heat engine-side housing are united, and wherein a partition separates an inside of the exhaust heat recovery device-side housing and an inside of the heat engine-side housing from one another such that a pressure in the exhaust heat recovery device-side housing and a pressure in the heat engine-side housing are isolated from one another.

13. The exhaust heat recovery apparatus according to claim 12, wherein in an exhaust gas passage of the heat engine, at least a heater of a heat exchanger that the exhaust heat recovery device includes is disposed between an exhaust port through which the heat engine discharges the exhaust gas and a purification catalyst for purifying the exhaust gas.

14. The exhaust heat recovery apparatus according to claim 13, wherein at least the heater of the heat exchanger that the exhaust heat recovery device includes is disposed in an exhaust manifold, which is connected to the exhaust port, and introduces the exhaust gas discharged from the heat engine into the purification catalyst.

15. The exhaust heat recovery apparatus according to claim 14, wherein the exhaust manifold and at least the heater of the heat exchanger are united.

16. The exhaust heat recovery apparatus according to claim 12, wherein a rotation axis of the heat engine and a rotation axis of the exhaust heat recovery device are arranged substantially in parallel.

17. The exhaust heat recovery apparatus according to claim 16, wherein a rotation axis of the heat engine and a rotation axis of the exhaust heat recovery device are arranged substantially in parallel, one next to the other.

18. The exhaust heat recovery apparatus according to claim 12, wherein a central axis of a cylinder of the heat engine and a central axis of a cylinder of the exhaust heat recovery device are arranged in parallel.

19. The exhaust heat recovery apparatus according to claim 18, wherein a central axis of a cylinder of the heat engine and a central axis of a cylinder of the exhaust heat recovery device are arranged substantially in parallel, one next to the other.

20. The exhaust heat recovery apparatus according to claim 12, wherein a central axis of a cylinder of the heat engine and a central axis of a cylinder of the exhaust heat recovery device are arranged inclined with respect to each other.

21. The exhaust heat recovery apparatus according to claim 12, wherein the heat engine is an internal combustion engine that is mounted on a vehicle, and wherein the exhaust heat recovery device is a Stirling engine that is mounted on a vehicle together with the internal combustion engine.

22. The exhaust heat recovery apparatus according to claim 12, wherein a heater which the exhaust heat recovery device includes has a substantially U-shape.

23. An exhaust heat recovery apparatus comprising:

a heat engine that generates motive power by burning a mixture of fuel and air, the heat engine including cylinders that form a first row, and an exhaust manifold associated with an upper portion of the cylinders of the first row, the cylinders of the first row being associated with a first crankshaft; and an exhaust heat recovery device that recovers thermal energy of an exhaust gas discharged from the heat engine and converts the thermal energy into kinetic energy, the exhaust heat recovery device including cylinders that form a second row, the cylinders of the second row being associated with a second crankshaft, and an upper portion of the exhaust heat recovery device is connected to the exhaust manifold, wherein the heat engine and the exhaust heat recovery device are united into a single structure, and said first and second rows are substantially parallel and standing one next to the other, wherein the first crankshaft is different from the second crankshaft, wherein the exhaust heat recovery device extends into the exhaust manifold via a downward facing opening of the exhaust manifold, wherein the downward facing opening encircles an upper portion of at least one cylinder of the second row of cylinders of the exhaust heat recovery device, wherein an exhaust heat recovery device-side housing and a heat engine-side housing are united, and wherein a partition separates an inside of the exhaust heat recovery device-side housing and an inside of the heat engine-side housing from one another such that a pressure in the exhaust heat recovery device-side housing and a pressure in the heat engine-side housing are isolated from one another.

24. The exhaust heat recovery apparatus according to claim 23, wherein in an exhaust gas passage of the heat engine, at least a heater of a heat exchanger that the exhaust heat recovery device includes is disposed between an exhaust port through which the heat engine discharges the exhaust gas and a purification catalyst for purifying the exhaust gas.

25. The exhaust heat recovery apparatus according to claim 24, wherein at least the heater of the heat exchanger that the exhaust heat recovery device includes is disposed in an exhaust manifold, which is connected to the exhaust port, and introduces the exhaust gas discharged from the heat engine into the purification catalyst.

26. The exhaust heat recovery apparatus according to claim 25, wherein the exhaust manifold and at least the heater of the heat exchanger are united.

27. The exhaust heat recovery apparatus according to claim 23, wherein a rotation axis of the heat engine and a rotation axis of the exhaust heat recovery device are arranged substantially in parallel.

28. The exhaust heat recovery apparatus according to claim 27, wherein a rotation axis of the heat engine and a rotation axis of the exhaust heat recovery device are arranged substantially in parallel, one next to the other.

29. The exhaust heat recovery apparatus according to claim 23, wherein a central axis of a cylinder of the heat engine and a central axis of a cylinder of the exhaust heat recovery device are arranged in parallel.

30. The exhaust heat recovery apparatus according to claim 29, wherein a central axis of a cylinder of the heat engine and a central axis of a cylinder of the exhaust heat recovery device are arranged substantially in parallel, one next to the other.

31. The exhaust heat recovery apparatus according to claim 23, wherein a central axis of a cylinder of the heat engine and a central axis of a cylinder of the exhaust heat recovery device are arranged inclined with respect to each other.

32. The exhaust heat recovery apparatus according to claim 23, wherein the heat engine is an internal combustion engine that is mounted on a vehicle, and wherein the exhaust heat recovery device is a Stirling engine that is mounted on a vehicle together with the internal combustion engine.

33. The exhaust heat recovery apparatus according to claim 23, wherein a heater which the exhaust heat recovery device includes has a substantially U-shape.

* * * * *